United States Patent [19]

Nava et al.

[11] Patent Number: 4,733,563

[45] Date of Patent: Mar. 29, 1988

[54] FLUID PRESSURE TRANSMITTER FOR USE IN POTENTIALLY EXPLOSIVE ATMOSPHERES

[75] Inventors: Gianmario Nava, Ponte Lambro; Pietro Tedesco, Grandola Ed Uniti, both of Italy

[73] Assignee: Kent-Tieghi S.p.A., Lenno, Italy

[21] Appl. No.: 860,486

[22] Filed: May 7, 1986

[30] Foreign Application Priority Data

Jul. 9, 1985 [IT] Italy ............................ 21496 A/85

[51] Int. Cl.$^4$ ........................... G01L 7/08; G01L 9/10
[52] U.S. Cl. ........................................ 73/706; 73/707; 73/722; 336/30
[58] Field of Search ................. 73/707, 722, 717, 718, 73/719, 720, 721, 728, 723, 724, 725, 726, 727, 706; 336/30

[56] References Cited

U.S. PATENT DOCUMENTS

| 2,789,192 | 4/1957 | White | 73/720 |
| 3,343,420 | 9/1967 | Kondo et al. | 73/720 |

Primary Examiner—Donald O. Woodiel
Attorney, Agent, or Firm—Wenderoth, Lind & Ponack

[57] ABSTRACT

A fluid pressure transmitter suitable for use in potentially explosive atmospheres of the type comprising a measuring transducer provided with inductive, capacitive or resistive sensor means, the transducer having at least one measuring chamber in which electrical or electronic transducing elements are located, the measuring chamber being defined on one side by a measuring diaphragm and carrying on the other side at least one flameproof joint capable to permit passage of a pressure fluid in a direction towards or away from the measuring diaphragm. In order to ensure, at the same time, the compliance with explosion safety regulations, a sufficient pressure fluid flow rate and a great simplicity in structure and in carrying out the contruction, the flameproof joint or joints consist of one or more peripheral grooves provided at the interface that is defined by a small cylinder when force-fitted in a corresponding recess.

11 Claims, 7 Drawing Figures

FLUID PRESSURE TRANSMITTER FOR USE IN POTENTIALLY EXPLOSIVE ATMOSPHERES

FIELD OF THE INVENTION

This invention relates to a fluid pressure transmitting apparatus suitable for use in potentially explosive atmospheres.

DESCRIPTION OF THE PRIOR ART

These transmitters, as utilized for sensing differential, relative or absolute pressures, consist, in a manner known per se, of a measuring transducer provided with inductive, capacitive or resistive sensor means, and having at least one measuring chamber including electrical or electronic transducing elements located therein and defined on one side by a measuring diaphragm. On its other side, the measuring chamber is closed by a so-called sealing diaphragm which is in turn connected with the environment (the process) of which it is desired to sense the pressure with reference to vacuum (absolute pressure), to atmosphere (relative or gauge pressure) or to another pressure (differential pressure). Between the measuring diaphragm and the sealing diaphragm, the measuring chamber is filled with a fluid, in general an oil, through which the pressure stresses applied to the sealing diaphragm are transmitted to the measuring diaphragm. In other systems using less sophisticated instruments, the sealing diaphragm is omitted and the process atmosphere comes into contact directly with the measuring diaphragm.

Owing to the fact that electrical or electronic elements are included in the instrument, protection must be provided, when the instrument is intended for use in a potentially explosive atmosphere, in order to prevent any sparks occurring at the electrical components from reaching the process atmosphere. This protection must comply with well specified regulations; in particular, reference is made to the CENELEC EN 50.018 European Regulation for " 'd' flameproof cases". Accordingly, it is necessary that the instrument, when intended for the above applications, should have at least one approved flameproof joint provided between the electrical or electronic elements in the measuring chamber and the process atmosphere. But, obviously, this flameproof joint should be able to permit passage, in both directions, of an adequate quantity of the fluid acting on the measuring diaphragm.

Since limitations imposed by the above regulations are rather expensive and difficult to be complied with, because of the extremely restricted passages involved, considerable problems for carrying the instrument into practice may arise when such a flameproof joint is to be provided.

It has been proposed to construct said joint, in instruments of the type referred to above, by conforming to the directions as applied to the case when shaft passage joints (cylindrical joints) are implied, namely by the provision of a hole of appropriate diameter into which there has been inserted a partially closing member having a smaller diameter, chosen so as to achieve the allowance prescribed by the regulations. This solution suffers from two kinds of disadvantages, namely the complexity of the construction due to the necessity of retaining the inner closure member in a "floating" manner in the hole, and the fact that, once the hole size is set, the area of passage for the measuring fluid flowing through the joint is also set, and this area of passage might not be compatible with the optimum operating condition of an instrument.

Accordingly, the object of this invention is to provide a fluid pressure transmitter for use in a potentially explosive atmosphere, in which the flameproof joint, in addition to complying with the specific safety regulations, is designed so as to be particularly simple and inexpensive in construction and very effective in operation, and, furthermore, to permit the passage area for the flow of fluid to and from the measuring membrane, to be adjusted at will at least to a given extent.

SUMMARY OF THE INVENTION

In accordance with the invention, the above objects are attained in a transmitter of the type as defined herein before, in that the flameproof joint or joints comprise one or more peripheral grooves provided at the interface that is defined by a small cylinder when forcefitted in a corresponding recess. In this way, the grooves can be provided in an easy manner with each of them complying with the regulations referred to above, while by varying in extent and number of said grooves it is possible to provide a desired area of passage for the measuring fluid. Moreover, the fact that the small cylinder is force-fitted in the corresponding recess makes for a simple construction and enables said cylinder to be even utilized as a support means for other components of the concerned instrument.

DESCRIPTION OF THE PREFERRED EMBODIMENTS

Figure 1:
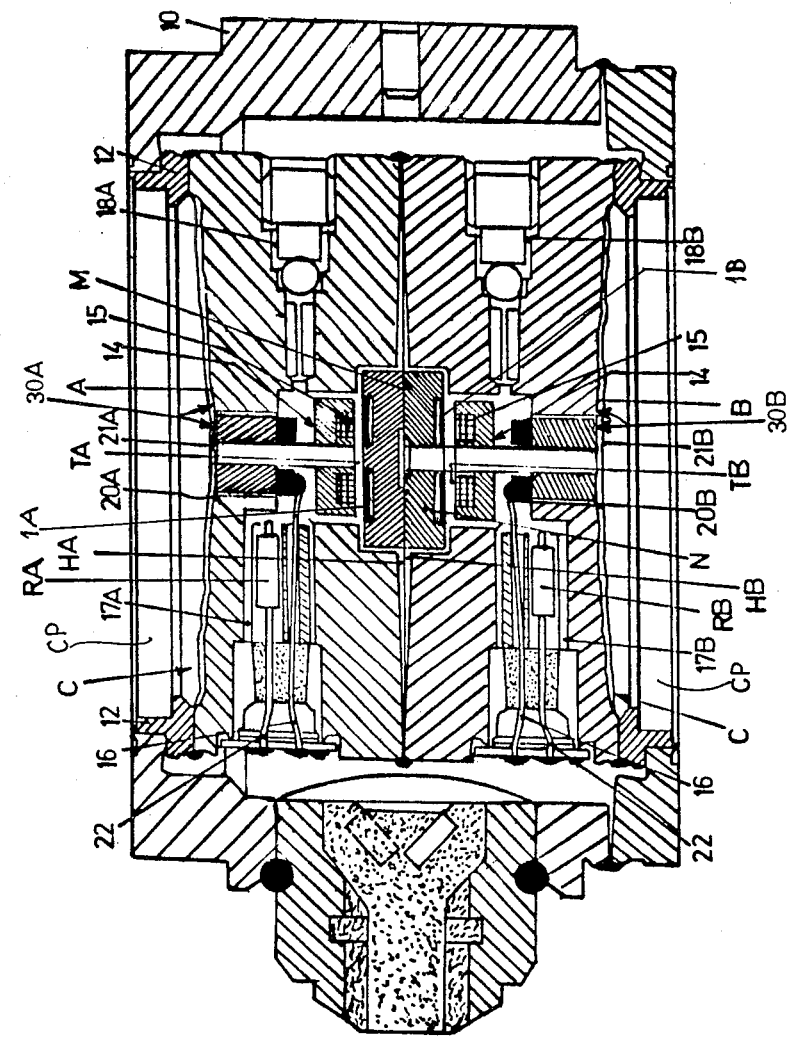
FIG. 1 is a cross-sectional view of a differential pressure transmitter according to the invention.

Referring now to the above figures and first to FIG. 1, there is shown a transducer comprising a central block C formed by two specularly half-bodies A-B which are tightly joined together as, for example, by welding. The block C is fixed and clamped by means of a sleeve member 10 bearing at 12 on block C.

The two rigid half-bodies A and B, when coupled and welded together, are holding a measuring diaphragm M in a manner to be locked and sealed in between along its periphery, said measuring diaphragm M defining two so-called measuring chambers HA and HB. The measuring diaphragm M has a central block N on which are supported disks 1A and 1B of a material having a high magnetic permeability.

Each half-body A-B carries a magnetic core 14 and an associated field coil 15, the cores being arranged to face the magnetic disks 1A and 1B on the block N carried by the diaphragm M. the coils 15 are supplied with alternating current via lead-in wires 16 to provide a magnetic field whose lines of force are closed across the magnetic core 14 and the associated magnetic disk 1A, 1B on block N. This will result in obtaining two magnetic circuits which, when the measuring diaphragm M has come to a complete standstill and defined two identical chambers HA and HB, will show the same electromagnetic values.

Each chamber HA and HB is provided with recesses 17A, 18A and 17B, 18B respectively, in which recesses are located the electrical components and conductors as well as the sealing system for sealing a filling liquid, as for example silicone oil, subsequent to its admission to the chambers. Each half-body A-B includes a flameproof device 30A-30B to be described hereinafter, with an interstice 20A and 20B bounded externally by a welded and sealed sealing diaphragm 21A, 21B which separates the measuring transducer of the instrument from the process fluid in process chambers CP.

The differential pressure applied to the two sealing diaphragms 21A and 21B is transferred through said two sealing diaphragms and the filling fluid to the measuring diaphragm M which converts said difference into a small displacement of its block N. This will in turn alter the air gaps TA and TB between the two disks 1A and 1B and the opposite fixed magnetic circuit formed by the magnetic cores 14 and their AC-supplied coils 15. The difference between the final and initial values of the two inductances represents the output from the differential pressure sensing transducer. In order to take the effect of static pressure into account, resistor RA and RB are located in the recesses 17A and 17B respectively, which resistors RA and RB are preferably of the carbon-paste type, are sensitive to the static pressure to which the instrument is subjected and are connected via conductors 22 to the processing circuit of the transducer.

Figure 2:
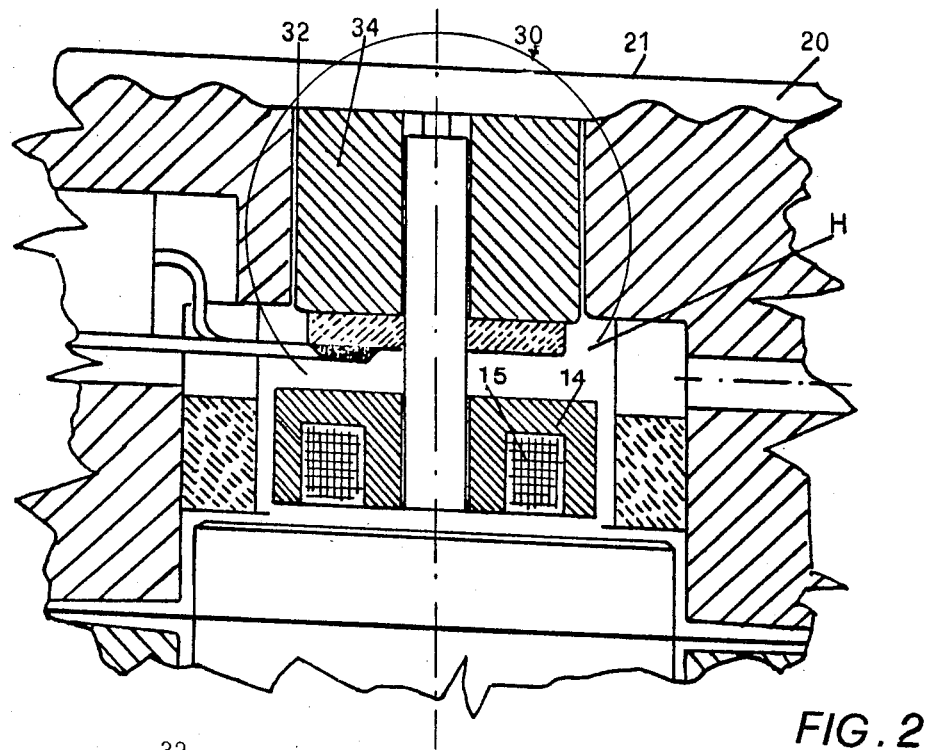
FIG. 2 is a detail sectional view corresponding to FIG. 1 showing a flameproof joint.
Figure 3:
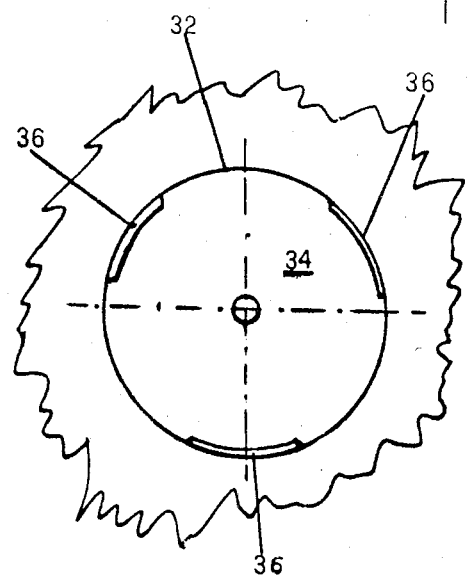
FIGS. 3 and 4 are a plan and a perspective view respectively, of the cylinder forming the joint in FIG. 2.
Figure 4:
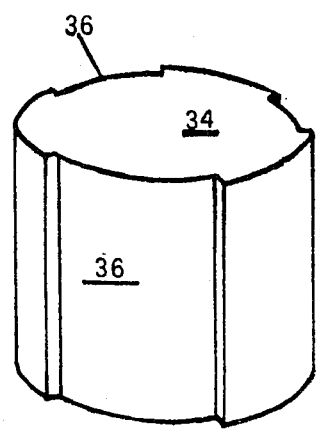

The flameproof device 30A and 30B is best shown in FIGS. 2 to 4. The flameproof device is shown at 30 in FIG. 2 and essentially comprises a cylindrical recess 32 (FIGS. 2 and 3) and a small cylinder 34 having an outer diameter equal to the diameter of the cylindrical recess, with the allowance therebetween being such as to permit the cylinder to be force-fitted into the receiving recess 32. The cylinder 34, which is made of metal material, has one or more axially extending grooves 36 formed on its periphery, the width of which grooves is such as to meet the regulations referred to above, while the overall circumferential extent of the grooves 36 may be chosen, consistent with their width, to ensure passage of the fluid from gap 20 between sealing diaphragm 21 and the central block C to chamber H, and conversely, under an optimum condition for the most effective operation of the instrument. In this way, the device can be very simple and precise in construction and production thereof on an industrial scale can be achieved with no difficulty. Moreover, no complexity in structure or operation of the instrument is involved when using this device but, on the contrary, the small cylinder, once force-fitted in place, can be utilized as a support for other components of the instrument as shown, by way of example, for the core 14 and coil 15.

Figure 5:
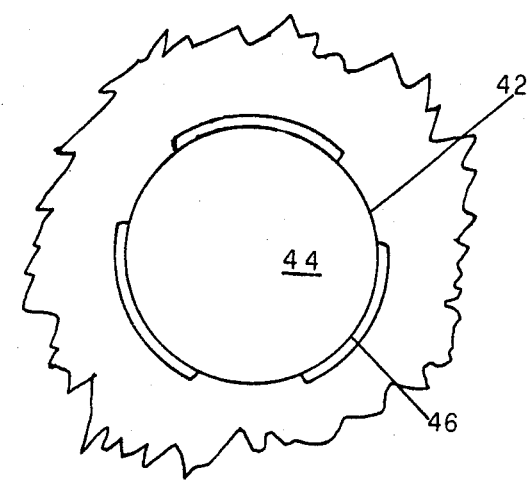
FIGS. 5 and 6 are plan views of a modified flameproof joint.
Figure 6:
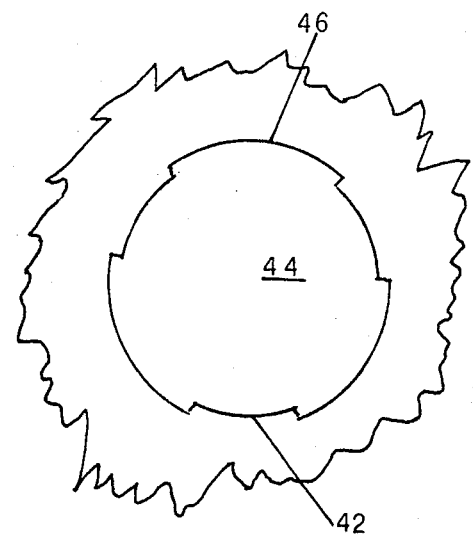
Figure 7:
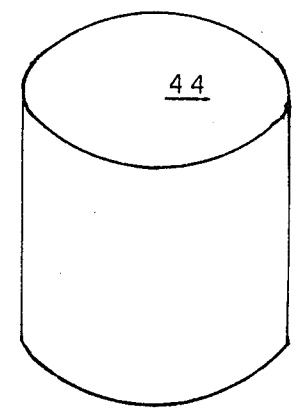
FIG. 7 is a perspective view of the cylinder used in this modified flameproof joint.

FIGS. 5, 6 and 7 show a variation of the flameproof device. This device substantially comprises, here again, a cylindrical recess 42 and a small metal cylinder 44 having an outer diameter equal to the diameter of the cylinder recess 42, with the allowance being such that the cylinder 44 can be held in a tight fit in the cylindrical-receiving recess 42. In this case, the recess 42 has one or more axially extending grooves 46 formed on the inner periphery thereof, the width of which grooves 46 is chosen to meet the regulations referred to above, while as to the overall circumferential extent of the grooves 46 the same considerations are applicable as made in connection with the embodiment in FIGS. 3 and 4.

For the device to comply with the above mentioned regulations, the axial length of the cylinder should be at least 6 mm, the radial size or width of the grooves on the order of 0.08 to 0.15 mm, while, as already stated, the circumferential extent of these grooves may be varied according to operational requirements for the concerned instrument.

While the present invention has been described with reference to the foregoing embodiments, it will be understood by those skilled in the art that various changes and modifications may be made thereto without departing from the scope of the appended claims.

What is claimed is:

1. A fluid pressure transmitter for use in potentially explosive atmospheres comprising a measuring transducer body provided with sensor means, said transducer body having therein at least one measuring chamber containing elements selected from the group consisting of electrical elements and electronic transducing elements in a part of said measuring chamber, said part of said measuring chamber being defined between a measuring diaphragm and at least one flameproof joint means for preventing sparks or flames from leaving said part of said measuring chamber and for permitting a pressurized fluid to flow into and out of said part of said measuring chamber, said flameproof joint means comprising a cylindrical body force-fitted in a bore formed in said transducer body, said bore having substantially the same diameter as the cylindrical body, an outer periphery of said cylindrical body being provided with at least one axially extending groove forming at least one interstice with an inner surface of said bore, said interstice being so dimensioned as to prevent sparks or flames from leaving said part of said measuring chamber through said interstice.

2. A fluid pressure transmitter according to claim 1, wherein said axially extending groove has a uniform depth in said outer periphery of said cylindrical body and a circumferential width of said axially extending groove can be varied to dimension said interstice.

3. A fluid pressure transmitter according to claim 1, wherein said groove has a uniform depth in said outer periphery of said cylindrical body within a range of 0.08 to 0.15 mm and said cylindrical body has an axial length within a range from 6 to 15 mm.

4. A fluid pressure transmitter according to claim 1, wherein said cylindrical body supports at least one component of said transducing elements contained in said part of said measuring chamber.

5. A fluid pressure transmitter according to claim 1, wherein said transducer body further includes a process chamber bounded by a sealing diaphragm, said sealing diaphragm being between said process chamber and said flameproof joint means, said measuring chamber being filled with a pressure transmitting fluid, and said at least one groove being sized to permit said fluid to flow therethrough so as to control a dynamic response of said fluid pressure transmitter.

6. A fluid pressure transmitter according to claim 1, wherein said at least one axially extending groove comprises a plurality of axially extending grooves.

7. A fluid pressure transmitter for use in potentially explosive atmospheres comprising a measuring transducer body provided with sensor means, said transducer body having therein at least one measuring chamber containing elements selected from the group consisting of electrical elements and electronic transducing elements in a part of said measuring chamber, said part of said measuring chamber being defined between a measuring diaphragm and at least one flameproof joint means for preventing sparks or flames from leaving said part of said measuring chamber and for permitting a pressurized fluid to flow into and out of said part of said measuring chamber, said flameproof joint means comprising a cylindrical body force-fitted in a bore formed in said transducer body, said bore having substantially the same diameter as the cylindrical body, an inner surface of said bore being provided with at least one axially extending groove forming at least one interstice with with an outer periphery of said cylindrical body, said interstice being so dimensioned as to prevent sparks or flames from leaving said part of said measuring chamber through said interstice.

8. A fluid pressure transmitter according to claim 7, wherein said axially extending groove has a uniform depth in said inner surface of said bore and a circumferential width of said axially extending groove can be varied to dimension said interstice.

9. A fluid pressure transmitter according to claim 7, wherein said groove has a uniform depth in said inner surface of said bore within a range of 0.08 to 0.15 mm and said groove has an axial length within a range from 6 to 15 mm.

10. A fluid pressure transmitter according to claim 7, wherein said cylindrical body supports at least one component of said transducing elements contained in said part of said measuring chamber.

11. A fluid pressure transmitter according to claim 7, wherein said at least one axially extending groove comprises a plurality of axially extending grooves.

* * * * *